(12) United States Patent
Deepak et al.

(10) Patent No.: US 7,721,090 B1
(45) Date of Patent: May 18, 2010

(54) EVENT-DRIVEN SIMULATION OF IP USING THIRD PARTY EVENT-DRIVEN SIMULATORS

(75) Inventors: Kumar Deepak, San Jose, CA (US); Satish R. Ganesan, Mountain View, CA (US); Jimmy Zhenming Wang, Saratoga, CA (US); Sundararajarao Mohan, Sunnyvale, CA (US); Ralph D. Wittig, Menlo Park, CA (US); Hem C. Neema, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1107 days.

(21) Appl. No.: 11/370,116

(22) Filed: Mar. 7, 2006

(51) Int. Cl.
*H04L 29/06* (2006.01)
*G06F 21/00* (2006.01)
*G06F 12/14* (2006.01)
*G06F 17/50* (2006.01)

(52) U.S. Cl. .................. 713/165; 713/167; 713/187; 703/13; 703/14; 703/15

(58) Field of Classification Search .................. 713/165, 713/167, 187
See application file for complete search history.

(56) References Cited

U.S. PATENT DOCUMENTS 7,107,567 B1 * 9/2006 LeBlanc ..................... 716/17
7,454,323 B1 * 11/2008 Bain ........................... 703/13
2004/0019873 A1 * 1/2004 Pochayevets et al. ........ 717/101
2005/0278682 A1 * 12/2005 Dowling ..................... 716/18
2006/0176077 A1 * 8/2006 Grabill et al. ................. 326/39

OTHER PUBLICATIONS

Synopsys; "Synopsys Logic Modeling Verilog Model Compiler (VMC)—Datasheet"; downloaded on Jan. 16, 2006 from http://www.synopsys.com/products/ipmodeling/vmc_ds.htrn1; pp. 1-5.

* cited by examiner

*Primary Examiner*—Shin-Hon Chen
(74) *Attorney, Agent, or Firm*—Kevin T. Cuenot

(57) ABSTRACT

A method of creating a secure intellectual property (IP) representation of a circuit design for use with a software-based simulator can include translating a hardware description language representation of the circuit design into an encrypted intermediate form and compiling the intermediate form of the circuit design to produce encrypted object code. The method further can include linking the encrypted object code with a simulation kernel library thereby creating the secure IP representation of the circuit design. The secure IP can include an encrypted simulation model of the circuit design and a simulation kernel configured to execute the encrypted simulation model.

19 Claims, 2 Drawing Sheets

EVENT-DRIVEN SIMULATION OF IP USING THIRD PARTY EVENT-DRIVEN SIMULATORS

BACKGROUND

1. Field of the Invention

The embodiments disclosed herein relate to the field of integrated circuits and, more particularly, to creating a secure software representation of a circuit design for use in testing and/or verification with a software-based simulator.

2. Description of the Related Art

Modern integrated circuits (ICs) are developed through the use of hardware description languages (HDLs). HDLs such as Verilog®, VHDL®, and the like allow developers to create software-based representations of circuit designs. One advantage of using an HDL is the potential for code reuse from one design to another. This concept has been realized with the commercial availability of intellectual property (IP) cores. In general, an IP core refers to a software representation of a semiconductor, a circuit design, or any portion thereof, that provides a processing function.

IP cores are made available by hardware vendors and other third party suppliers. Presently, there is a strong demand for IP cores as designers use these software components to create and simulate embedded designs and digital signal processing designs. IP cores typically are implemented in an HDL. If distributed in this form, however, all information, whether licensed or not, relating to the supplier's IP core or the circuit design represented by the IP core would be revealed to third parties. Accordingly, IP core providers have an interest in securing IP cores prior to distribution and protecting them from reverse engineering.

One technique for securing an IP core is to pre-compile it prior to distribution to third parties. The IP core is distributed as compiled object code, which effectively encrypts the IP core. This manner of protection requires that the IP core be compiled specifically for use with each different third party simulation tool with which the IP core is to be used. The IP core is compiled using a third party compiler intended for use with the target simulator. Because the IP core is originally coded in a particular type of HDL, such as Verilog® for example, the resulting compiled object code must be executed in a particular type of Simulator. For example, simulation of a Verilog® IP core requires a Verilog® simulator. Alternatively, the user can purchase a mixed language simulator capable of executing both Verilog® and VHDL® IP cores. Mixed language simulators, however, can be very costly for the end user.

Another disadvantage of providing a pre-compiled IP cores is that the IP core may not be completely secure. Because the IP core is compiled using a third party compiler, it may be possible for the compiler creator, or another party, to inadvertently or deliberately reconstitute the object code into human readable form. This would expose the IP core provider's sensitive information.

Even if the IP core is not de-compiled, many third party encryption mechanisms still leave design details, such as the design hierarchy, exposed when the compiled IP core is used within the simulator. For example, when the compiled code of the IP is loaded into an HDL simulator, details such as the design hierarchy, names of signals, widths of signals, and the like, typically can be viewed. Also, the values of internal signals can be traced and/or viewed during simulation.

Another technique for securing an IP core is to provide the IP core in encrypted form. In that case, the IP core provider provides an interface, for example a SWIFT model (a description can be found at www.synopsys.com/products/ipmodeling/vmc_ds.html), to the encrypted IP core. This manner of protection, however, is not suited for use with parameterizable IP cores. A parameterizable IP core allows a user to specify a particular value for an attribute "X" of the IP core, thereby altering the functionality and/or interface of the IP core in some fashion according to the assigned value of "X". To produce a parameterizable, encrypted IP core, a different interface would have to be created for each possible value of "X" for the end user to utilize the full range of functionality offered by the parameterizable IP core. If the IP core has more than one adjustable attribute, such an interface would need to be created for each possible combination of attribute values, leading to a combinatorially large, and infeasible, number of interfaces to be created.

It would be beneficial to provide a technique for creating and using secure IP cores in a manner which overcomes the limitations described above.

SUMMARY OF THE INVENTION

The present invention provides methods and articles of manufacture relating to secure software representations of circuit designs. One embodiment of the present invention can include a method of creating a secure intellectual property (IP) representation of a circuit design for use with a software-based simulator. The method can include translating a hardware description language (HDL) representation of the circuit design into an encrypted, intermediate form, which subsequently can be deleted. The encrypted intermediate form can be an encrypted form of a general-purpose, high level programming language, such as C++.

The translating step can include obfuscating the HDL representation of the circuit design. The translating step also can include generating a wrapper interface. The wrapper interface can implement a standard foreign object interface for the circuit design. The secure IP representation of the circuit design can support, or be used within, both event-driven and cycle-based simulations.

The intermediate form of the circuit design and the wrapper interface can be compiled to produce encrypted object code. The encrypted object code can be linked with a simulation kernel library thereby creating the secure IP representation of the circuit design. The linking step can include creating an encrypted simulation model of the circuit design and a simulation kernel configured to execute the encrypted simulation model. In one embodiment, the secure IP representation of the circuit design can be implemented as a shared object library.

An HDL wrapper that specifies an interface for one or more types of HDL for the secure IP representation of the circuit design also can be created. The method further can include parameterizing the encrypted simulation model by passing a value for a parameter of the secure IP representation of the circuit design into the simulation kernel during a simulation session.

Another embodiment of the present invention can include a secure IP representation of a circuit design for use in a third-party simulator. The secure IP representation can include an encrypted simulation object representing the circuit design and a simulation kernel configured to execute the encrypted simulation object. The secure IP representation further can include an HDL wrapper configured to serve as an interface between the third party simulator and the simulation kernel.

The encrypted simulation object can include a standard foreign object interface. The HDL wrapper can specify an interface for a plurality of hardware description languages. The secure IP representation can be parameterized by passing at least one value for parameterizing the secure IP representation to the simulation kernel.

Yet another embodiment of the present invention can include a machine readable storage having stored thereon a plurality of code sections for causing a machine to perform the various steps and/or functions described herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments described herein relate to software representations of circuit designs which can be executed by a software-based simulator. In accordance with the embodiments disclosed herein, a secure software-based representation of a circuit design, referred to as a secure Intellectual Property (IP) core, or secure IP, can be created. The secure IP provides a high degree of security in that decrypting and/or decoding the secure IP into a human readable format is exceedingly difficult. The secure IP can be executed directly by a software-based simulator, whether the simulator is configured as a Verilog simulator, a VHDL simulator, or a mixed-language simulator. The secure IP remains parameterizable when used with the simulator despite the high level of security provided.

Figure 1:
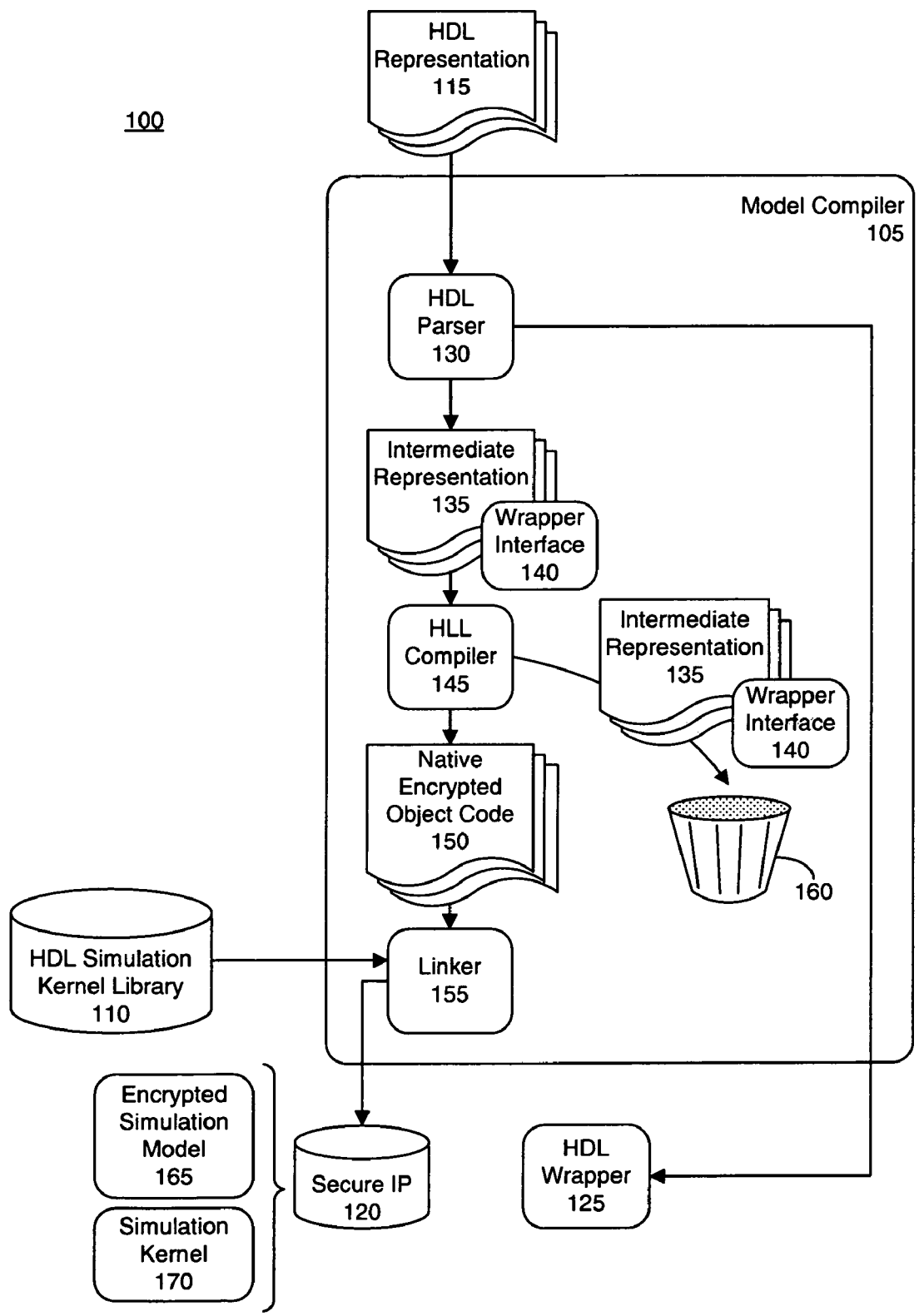
FIG. 1 is a block diagram illustrating a system for creating a secure software representation of a circuit design in accordance with one embodiment of the present invention.

FIG. 1 is a block diagram illustrating a system 100 for creating a secure software representation of a circuit design in accordance with one embodiment of the present invention. As shown, system 100 includes a model compiler 105 and a hardware description language (HDL) simulation kernel library 110. In general, the model compiler 105 processes an HDL representation 115 of a circuit design to create a secure software representation of the circuit design, referred to as secure IP 120. The HDL representation 115 can be an IP core (for example, PCI Express, Ethernet MAC, PowerPC, or other soft cores commercially available from Xilinx, Inc.) or another HDL-based software representation of a circuit design that can be loaded and executed by a software-based simulation tool (for example, Mentor graphic's ModelSim simulator). An HDL wrapper 125 also is created which, in conjunction with other components of the present invention to be described herein, allows the secure IP 120 to be used seamlessly with a variety of different simulators.

As shown, the model compiler 105 includes an HDL parser 130 and a High Level Programming Language (HLL) compiler 145. The HDL parser 130 processes the HDL representation 115 to produce an intermediate representation 135. The intermediate representation 135 can be a translation of the HDL representation 115 into a general-purpose HLL representation of the circuit design. In one embodiment, the HLL used can be C or C++. It should be appreciated, however, that the particular HLL used is not intended to limit the present invention and that any of a variety of different general-purpose HLLs can be used. In any case, the HDL parser 130 translates the HDL representation 115 into the intermediate representation 135. Further, the HDL parser 130 can encrypt the resulting intermediate representation 135. Accordingly, the intermediate representation 135 that is provided as output from the HDL parser 130 is an encrypted, general-purpose, HLL representation of the circuit design. An example of a HDL parser 130 is the Verific HDL parser from Verific Design Automation, Inc. which can be used to build a desired HDL to HLL compiler capable of generating a HLL model 135 for the HDL representation 115. Examples of a HLL compiler are Gnu C/C++ compiler and Microsoft C++ compiler.

In one embodiment, the intermediate representation 135 is encrypted in a manner that is specific to the implementation of the HDL simulation kernel library 110. The intermediate representation 135 is valid HLL code that can be compiled by a compiler without any special configuration. In generating the intermediate representation 135, the HDL parser 130 obfuscates the resulting code by obfuscating symbols that are defined in the HDL simulation kernel library 110. Obfuscated, or shrouded, code refers to source code that is difficult to read or understand. Languages such as C, C++, and Perl, for example, are considered obfuscatable languages. The HDL parser can mask the standard language syntax and grammar from the main body of code. In any case, the definitions of obfuscated symbols are hidden within the HDL simulation kernel library 110. Any of a variety of different obfuscation techniques can be used including, but not limited to, layout obfuscation, data obfuscation, storage obfuscation, encoding obfuscation, aggregation obfuscation, ordering obfuscation, control obfuscation, aggregation obfuscation, or the like.

The HDL parser 130 further generates a wrapper interface 140. The wrapper interface 140 can be formatted, or implemented, using the same general-purpose HLL into which the HDL representation 115 is translated. The wrapper interface 140 provides a standardized interface to the intermediate representation 135 of the circuit design. Unlike the intermediate representation 135, the wrapper interface 140 is not encoded or translated into an encrypted form.

In one embodiment, the wrapper interface 140 can be described using one or more of the standard foreign model interfaces used to interface an HDL description of a circuit design with other components coded in C, another HLL, or other third-party software. Examples of standard foreign model interfaces can include, but are not limited to, Programming Language Interface (PLI) as is used for providing Verilog support, Foreign Language Interface (FLI) as is used for providing VHDL support, and/or VHDL Procedural Interface (VHPI).

The HLL compiler 145 compiles the intermediate representation 135 and the wrapper interface 140. More particularly, the HLL compiler 145 can be configured to compile the particular HLL into which the intermediate representation 135 and the wrapper interface 140 are translated and/or implemented. The HLL compiler 145 compiles the intermediate representation 135 and the wrapper interface 140 into native encrypted object code 150. As noted, because the intermediate representation 135 is valid HLL code, the compiler 145 need not include any special functionality for processing the intermediate representation 135.

The linker 155 links together the various portions of native encrypted object code that may be created as output from the HLL compiler 145. As known, source code, whether HDL or HLL, may be located in more than one file. In such cases, the HLL compiler 145 may convert the separate source files into object code that also is in separate files. In order to create a single executable program or object, the separate object files are combined together using linker 155.

The linker 155 further links, or incorporates, the HDL simulation kernel library 110 with the native encrypted object code 155 to produce the secure IP 120. In one embodiment, the secure IP 120 can be implemented as a shared object library, for example a dynamic link library (DLL). In any case, the secure IP 120 can include two components, an encrypted simulation model 165 and a simulation kernel 170 which executes the encrypted simulation model 165. The simulation kernel 170 is created from the various functions of the HDL simulation kernel library 110.

The HDL parser 130 also generates an HDL wrapper 125. The wrapper 125, in combination with the kernel 170, allows a simulator to seamlessly execute the secure IP 120 as any other HDL IP core. The wrapper 125 can sensitize the interface signals of the secure IP 120 to the HDL simulation kernel 170, which is foreign to the third party HDL simulator within which the secure IP 120 is used.

With respect to Verilog, for example, the HDL wrapper 125 can include a module declaration which describes the interface and functional composition of the secure IP 120 to other designs in the same environment, i.e. simulation. With respect to VHDL, the HDL wrapper 125 can include various types of declarations such as an entity-architecture pair which provides the necessary port and functional description of the secure IP 120. The HDL wrapper 125 can specify the interface of the secure IP 120 for more than one type of HDL, i.e. both Verilog® and VHDL®, thereby allowing either type of simulator, as well as a mixed language simulator, to effectively execute the secure IP 120.

In illustration, when a value of a signal on the HDL wrapper 125 changes, the HDL simulation kernel 170 is invoked and evaluates the encrypted simulation model 165. The HDL simulation kernel 170 passes back the evaluated output through HDL wrapper 125 to the third party HDL simulator. Depending upon the particular secure IP model, it may be required at times to register a time based call back on the third party HDL simulator so that HDL simulation kernel 170 can synchronize events with the kernel of the third party HDL simulator.

The HDL simulation kernel 170 does not have a full view of the secure IP 120. Details of the secure IP 120 are distributed across compiled, encrypted, simulation model code 165 and the HDL simulation kernel 170. The HDL wrapper 125 also does not allow third parties to gain access to any information regarding the secure IP 120.

The HDL wrapper 125 also can be used by the simulator to load the secure IP 120. While other IP cores execute within the third party HDL simulator, the encrypted simulation model 165 is executed by the simulation kernel 170. The simulation kernel 170 functions as a container and interface between the encrypted simulation model 165 and the third party HDL simulator. Further, one or more values for different parameters of the secure IP 120 can be passed into the encrypted simulation model 165 via the simulation kernel 170. Because values for parameters do not have to be fixed at the time the secure IP 120 is created, the embodiments described herein are well suited for use with parametric IP cores.

Once the secure IP 120 and the HDL wrapper 125 are generated, the HLL compiler 145 can discard the intermediate representation 135 as well as the wrapper interface 140 as illustrated by trash bin 160. The components can be deleted in a secure fashion such that neither is recoverable. This provides an added measure of security for the resulting secure IP 120.

As noted, once generated, secure IP 120 can be used seamlessly within a third party simulator. To illustrate one way in which the secure IP 120 can function, consider the generalized case in which the encrypted simulation model 165 of secure IP 120 has a port named "CLOCK". The CLOCK port is driven by the third party simulator. The third party simulator can access the functionality of the secure IP 120 via HDL wrapper 125. The simulator drives the CLOCK port by placing a clock change command on the HDL wrapper 125. The HDL wrapper 125, in turn, invokes a function within the simulation kernel 170 to change the clock of the encrypted simulation model 165. The simulation kernel 170 calls the appropriate function of the encrypted simulation model 165, or otherwise interacts with the encrypted simulation model 165, to cause the clock to change as requested by the simulator. Values returned from the encrypted simulation object 165 are provided to the simulation kernel 170, which in turn provides those values to the HDL wrapper 125 to be provided to the simulator.

The wrapper interface 140, which is included in the encrypted simulation object 165, can arbitrate transactions between the third party simulator and the secure IP 120. That is, as the wrapper interface 140 implements an interface which is known to the third party simulator, the wrapper interface 140 can perform any translations that may be required in passing communications between the third party simulator and the encrypted simulation object 165. The wrapper interface 140 effectively processes boundary transactions between the third party simulator and the Secure IP.

Figure 2:
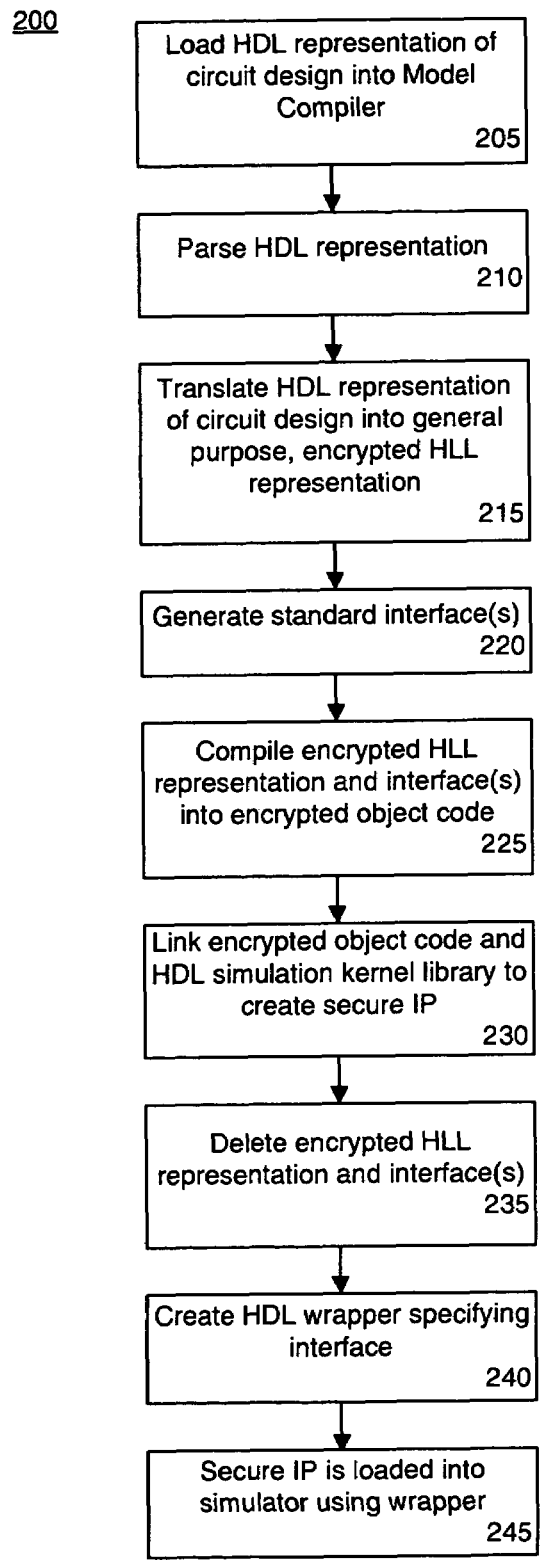
FIG. 2 is a flow chart illustrating a method of creating and using a secure software representation of a circuit design in accordance with another embodiment of the present invention.

FIG. 2 is a flow chart illustrating a method 200 of creating and using a secure software representation of a circuit design in accordance with another embodiment of the present invention. Method 200 can be performed by a system such as the one illustrated with reference to FIG. 1. Accordingly, in step 205, an HDL representation of a circuit, such as an IP core, can be loaded into the model compiler. In step 210, the HDL representation can be parsed by an HDL parser in the model compiler to identify the various elements of the HDL representation.

In step 215, the HDL representation of the circuit design can be translated into a general-purpose, encrypted, HLL representation of the circuit design by the HDL parser. In step 220, the HDL parser can generate a wrapper interface to the encrypted HLL representation of the circuit design. The wrapper interface can be described according to one or more standardized foreign model interface specifications. Accordingly, the simulator with which the secure IP is used need only support one of the foreign model interfaces incorporated into the secure IP.

In step 225, an HLL compiler in the model compiler can compile the encrypted HLL representation of the circuit design along with the wrapper interface. The output from the HLL compiler is native encrypted object code. In step 230, a linker can link the various portions of encrypted object code as well as link or incorporate the HDL simulation kernel library. The output from the linker is the secure IP which can be implemented as a shared object library such as a DLL as noted.

In step 235, the encrypted HLL representation of the circuit design, i.e. referred to as the intermediate representation, as well as the interfaces that were generated can be deleted. In step 240, an HDL wrapper can be generated that specifies the design hierarchy of the secure IP. Once generated, the secure IP can be used with a simulator in step 245 using the HDL wrapper as any other IP core. As noted, the encrypted simulation model can be executed by the simulation kernel. With this structure, the secure IP can be executed in a simulator that does not support the original type of HDL used to create the software representation of the circuit design. For example, if the original HDL representation was coded in Verilog®, the resulting secure IP can be used seamlessly within a simulator configured to execute VHDL®.

The embodiments disclosed herein provide a solution for creating a secure software representation of a circuit design. The encrypted simulation model incorporates standardized foreign model interfaces and an HDL wrapper which facilitates use of the encrypted model by a variety of different simulators including Verilog®, VHDL®, and mixed language. Since the encrypted model is executed using its own simulation kernel, the secure IP described herein is useful for parametric models as values need not be fixed at the time the secure IP is created, but rather can be passed to the IP during simulation. It also should be appreciated that due to the inclusion of the self-contained simulation kernel, the secure IP can support both event-driven and cycle-based simulation techniques. That is, the resulting secure IP can be used within a cycle-based simulation and within a transaction-based simulation since control over the encrypted object model is exercised via the simulation kernel included therein. Combining both varieties of simulation can significantly increase the speed of simulation.

The embodiments disclosed herein can be realized in hardware, software, or a combination of hardware and software. The embodiments can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The embodiments described herein also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

This invention can be embodied in other forms without departing from the spirit or essential attributes thereof. Accordingly, reference should be made to the following claims, rather than to the foregoing specification, as indicating the scope of the invention.

What is claimed is:

1. A method of creating a secure intellectual property (IP) representation of a circuit design for use with a software-based simulator, said method comprising:
  translating a hardware description language representation of the circuit design into an intermediate form specified using a general-purpose, high level programming language;
  obfuscating the general-purpose, high level programming language of the intermediate form using at least one obfuscation technique operable on the general-purpose high level programming language;
  compiling the intermediate form of the circuit design to produce encrypted object code; and
  linking the encrypted object code with a simulation kernel library creating the secure IP representation of the circuit design comprising an encrypted simulation model of the circuit design and a simulation kernel configured to execute the encrypted simulation model in coordination with the simulator,
  wherein the simulator is a hardware description language simulator.

2. The method of claim 1, said translating step further comprising generating a wrapper interface, wherein the wrapper interface implements a standard foreign object interface for the circuit design.

3. The method of claim 2, wherein the secure IP representation of the circuit design supports event-driven and cycle-based simulation.

4. The method of claim 1, wherein the secure IP representation of the circuit design is implemented as a shared object library.

5. The method of claim 1, further comprising parameterizing the encrypted simulation model by passing a value for a parameter of the secure IP representation into the simulation kernel during a simulation session.

6. The method of claim 1, said translating step further comprising obfuscating the hardware description language representation of the circuit design.

7. The method of claim 1, further comprising creating a hardware description language wrapper specifying an interface for at least one type of hardware description language for the secure IP representation.

8. The method of claim 1, wherein the intermediate form of the circuit design comprises an encrypted form of the general-purpose, high level programming language.

9. The method of claim 1, further comprising deleting the intermediate form of the circuit design.

10. A computer configured to execute a secure Intellectual Property (IP) representation of a circuit design for use with a hardware description language simulator, the computer comprising:
- an encrypted simulation object representing the circuit design compiled from an obfuscated, general-purpose, high level programming language representation of the circuit design;
- a simulation kernel configured to execute the encrypted simulation object in coordination with the hardware description language simulator; and
- a hardware description language wrapper configured to serve as an interface between the hardware description language simulator and the simulation kernel.

11. The computer of claim 10, wherein the encrypted simulation object comprises a standard foreign object interface.

12. The computer of claim 10, wherein the hardware description language wrapper specifies an interface for a plurality of hardware description languages.

13. The computer of claim 10, wherein the secure IP representation is parameterized by passing at least one value for parameterizing the secure IP representation to the simulation kernel.

14. A machine readable storage having stored thereon a computer program having a plurality of code sections comprising:
- code for translating a hardware description language representation of a circuit design into an intermediate form, wherein the intermediate form is an encrypted, general-purpose, high level programming language representation of the circuit design;
- code for obfuscating the general-purpose, high level programming language of the intermediate form using at least one obfuscation technique operable on the general-purpose high level programming language creating the encrypted, general-purpose, high level programming language representation of the circuit design;
- code for compiling the intermediate form of the circuit design to produce encrypted object code; and
- code for linking the encrypted object code with a simulation kernel library thereby creating the secure software object representation of the circuit design comprising an encrypted simulation model and a simulation kernel configured to execute the encrypted simulation model in cooperation with the software-based simulation system,
- wherein the simulation system comprises a hardware description language simulation system.

15. The machine readable storage of claim 14, further comprising code for generating a wrapper interface that implements a standard foreign object interface for the circuit design.

16. The machine readable storage of claim 15, wherein the secure IP representation of the circuit design supports event-driven and cycle-based simulation.

17. The machine readable storage of claim 14, wherein the secure software object representation is parameterized by passing a value of a parameter to the encrypted simulation model via the simulation kernel.

18. The machine readable storage of claim 14, further comprising code for creating a hardware description language wrapper specifying an interface for the secure software object representation using at least one hardware description language.

19. The machine readable storage of claim 14, further comprising code for deleting the encrypted intermediate form of the circuit design.

* * * * *